United States Patent [19]
Paxton

[11] 4,085,665
[45] Apr. 25, 1978

[54] ADJUSTABLE AUTOMOBILE VENT
[75] Inventor: Stephen J. Paxton, Troy, Mich.
[73] Assignee: Stephen J. Paxton, Trust, Troy, Mich.
[21] Appl. No.: 734,720
[22] Filed: Oct. 22, 1976
[51] Int. Cl.² ............................................. B60J 1/20
[52] U.S. Cl. ...................................... 98/2.12; 98/2.13; 296/84 B; 296/91
[58] Field of Search .................. 98/2, 2.12, 2.13, 2.19; 296/84 A, 84 B, 84 C

[56] References Cited
U.S. PATENT DOCUMENTS

| | | | |
|---|---|---|---|
| 1,588,202 | 6/1926 | Spencer | 296/84 C |
| 1,689,035 | 10/1928 | Hodny | 296/84 C |
| 1,950,329 | 3/1934 | Singer | 98/2.13 |
| 2,147,855 | 2/1939 | Normandin | 98/2.12 |
| 2,594,682 | 4/1952 | Ritch | 98/2.12 |
| 2,797,126 | 6/1957 | Brooks | 98/2.12 |
| 3,162,112 | 12/1964 | Wheeler | 98/2.12 |
| 3,618,507 | 11/1971 | Rakocy | 98/2.12 |
| 4,033,245 | 7/1977 | DeRees | 98/2.13 |

Primary Examiner—John J. Camby
Assistant Examiner—Henry C. Yuen
Attorney, Agent, or Firm—Harness, Dickey & Pierce

[57] ABSTRACT

A device for diverting air from the outside of an automotive vehicle to the interior. The device comprises a base attached to a pillar of the vehicle and an elongated deflector of arcuate cross-sectional shape movably mounted on the base. The deflector may be stored parallel to the pillar or swung through a partial opening in the window to divert air from the outside. The position of the deflector may be adjusted angularly in several different directions to direct the air in the manner desired.

2 Claims, 3 Drawing Figures

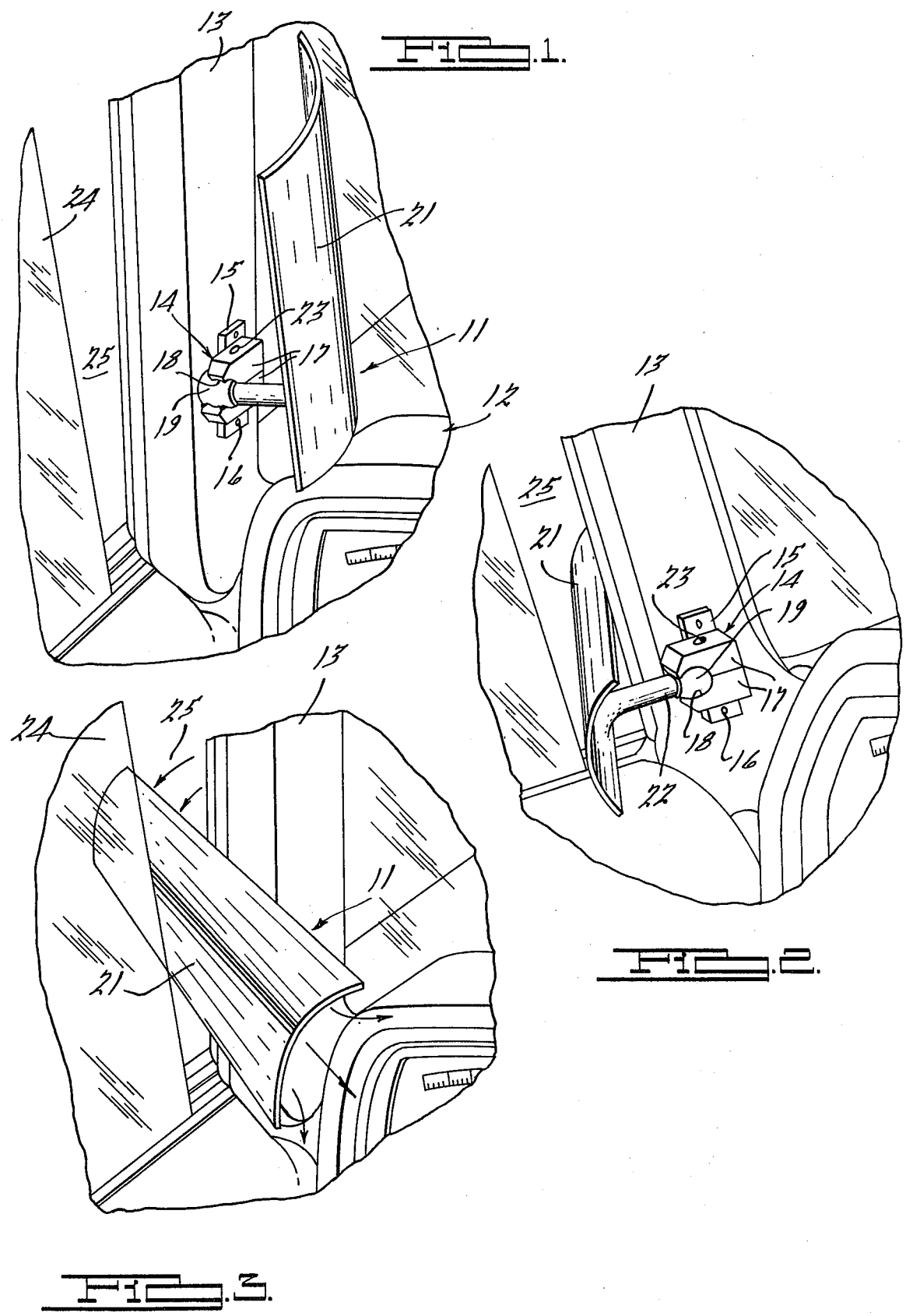

ADJUSTABLE AUTOMOBILE VENT

BACKGROUND OF THE INVENTION

The invention relates to ventilating devices for automotive vehicles, and particularly to accessories for deflecting air from the outside of the vehicle to the interior in a controlled and comfortable manner without the need for substantial opening of the window.

BRIEF SUMMARY OF THE INVENTION

It is an object of the invention to provide a novel and improved adjustable automobile vent which is inexpensive to manufacture, easy to install, and affords great control of the volume and direction of flow of the incoming air.

It is another object to provide an improved vent of this nature which may be stored out of the driver's line of vision when not in use, and is easily accessible to and adjustable by the driver.

Briefly, the adjustable automobile vent of this invention comprises a base, means securing said base to a pillar of an automotive vehicle, an elongated deflector having a cross section creating a recessed surface on one side thereof, and means movably mounting said deflector on said base in a manner permitting the deflector to be moved between a first position parallel to and adjacent the pillar and an operating position extending partially out of and partially into the car interior through an opening created by partial retraction of the adjacent vehicle window.

BRIEF DESCRIPTION OF THE DRAWINGS

FIG. 1 is a fragmentary perspective view of a portion in an automotive vehicle showing the invention mounted therein and in its stored position;

FIG. 2 is a view similar to FIG. 1 but showing the vent in an operative position extending from the window; and FIG. 3 is a view similar to FIG. 2 but showing the vent in another extended position which directs the air flow in a different direction than FIG. 2.

DESCRIPTION OF THE PREFERRED EMBODIMENT

The device is generally indicated at 11 and is intended to be mounted in an automotive vehicle generally indicated at 12 which has a conventional roof pillar 13. Although the illustrated pillar is the left front pillar near the driver's position, it will be understood that the invention could be used in other locations within the vehicle.

The invention comprises a base generally indicated at 14 having a flat rectangular mounting portion 15 securable to the inside of pillar 13, for example by fasteners 16, by an adhesive bond, or other fastening methods. As shown, the base is mounted on the lower portion of pillar 13. The base also comprises a split clamping portion 17 attached to the mounting portion and having a rearwardly open socket 18. The socket receives a ball 19 carried by a deflector 21. More particularly, the deflector is of elongated shape, being convex on its side away from base 14 and concave on the facing side, the deflector thus having an arcuate cross-sectional shape. Ball 19 is carried by the end of a stem 22 which extends outwardly from the concave side of the deflector adjacent one end thereof. The frictional grip of socket 18 on ball 19 may be adjusted by a screw 23 in clamping portion 17.

In use, the deflector will normally be stored in a position as shown in FIG. 1 parallel to pillar 13. In this position, it will be out of the line of the sight of the driver so that it will not interfere with his driving performance. When it is desired to deflect a limited amount of air into the vehicle, window 24 will be slightly retracted, leaving an opening 25 between the forward edge of the window and pillar 13. The deflector may then be swung outwardly through this opening as shown in FIG. 2 or FIG. 3. More particularly, deflector 21 will be swung rearwardly from its FIG. 1 position until it is aligned with opening 25, and then the longer end of the deflector will be swung outwardly through the window space. This will cause the wind to strike the concave side of the deflector and flow inwardly as shown by the arrows in FIG. 3. By rotating the deflector about ball 19 in any of several directions, the exact direction of air flow may be varied to suit the driver or adjacent occupants of the vehicle. At the same time, the window will not be open wide enough to cause an annoying draft.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. An adjustable automobile vent comprising a single base, means securing said base to the inside of a stationary pillar of an automotive vehicle, an elongated deflector having an arcuate cross section creating a recessed surface on one side thereof, and means movably mounting said deflector on said base in a manner permitting the deflector to be moved between a first position inside the vehicle with the axis of said arcuate cross section closely parallel to and adjacent said pillar and a second operating position extending partially out of and partially into the car interior through an opening created by partial retraction of the adjacent vehicle window, said mounting means comprising a stem extending from the concave surface of said deflector adjacent one end thereof and carrying a ball, said base having a socket receiving said ball, said socket being open in a rearward direction whereby said deflector may be swung rearwardly from its stored position and then swung outwardly through a window opening to a position wherein the axis of said arcuate cross section is transverse to said pillar.

2. The combination according to claim 1, said socket having adjustable friction means.

* * * * *